United States Patent [19]
Bogosian

[11] 3,739,913
[45] June 19, 1973

[54] DEVICE FOR FENCING AND ABSORBING CONTAMINATING OIL SPILLS ON WATER

[75] Inventor: Theodore Oscar Bogosian, Somerville, N.J.

[73] Assignee: Johns-Manville Corporation, New York, N.Y.

[22] Filed: July 16, 1970

[21] Appl. No.: 55,338

Related U.S. Application Data

[63] Continuation-in-part of Ser. No. 805,465, March 10, 1969, abandoned, which is a continuation-in-part of Ser. No. 748,977, July 31, 1968, abandoned.

[52] U.S. Cl............ 210/242, 210/484, 210/DIG. 21
[51] Int. Cl............................................. E02b 15/04
[58] Field of Search ...................... 210/23, 40, 242, 210/484, DIG. 21

[56] References Cited
UNITED STATES PATENTS

| | | | |
|---|---|---|---|
| 3,536,616 | 10/1970 | Kondoh et al. | 210/DIG. 21 |
| 3,494,862 | 10/1970 | Horowitz | 210/40 |
| 3,464,920 | 9/1969 | Pirson et al. | 210/40 X |
| 3,539,013 | 11/1970 | Smith | 210/242 |
| 2,228,529 | 1/1941 | Moeller | 210/DIG. 21 |
| 3,238,056 | 3/1966 | Pall et al. | 210/505 X |
| 2,399,158 | 4/1946 | Armaly | 210/484 |

FOREIGN PATENTS OR APPLICATIONS

| | | | |
|---|---|---|---|
| 979,978 | 1/1965 | Great Britain | 210/DIG. 21 |

*Primary Examiner*—Samih N. Zaharna
*Attorney*—John A. McKinney and Robert M. Krone

[57] ABSTRACT

An elongate body of oil absorbing material and flotation material including longitudinal reinforcing or strengthening means whereby a plurality of bodies can be linearly disposed in end-to-end relationship for temporarily fencing oil spills on water for retention and absorption of the oil.

The body contents comprise oil absorbing fibers — natural or synthetic or combinations thereof — and may include a flotation material interspersed therewith to aid buoyancy of the body even after saturation of the fibers by oil.

9 Claims, 8 Drawing Figures

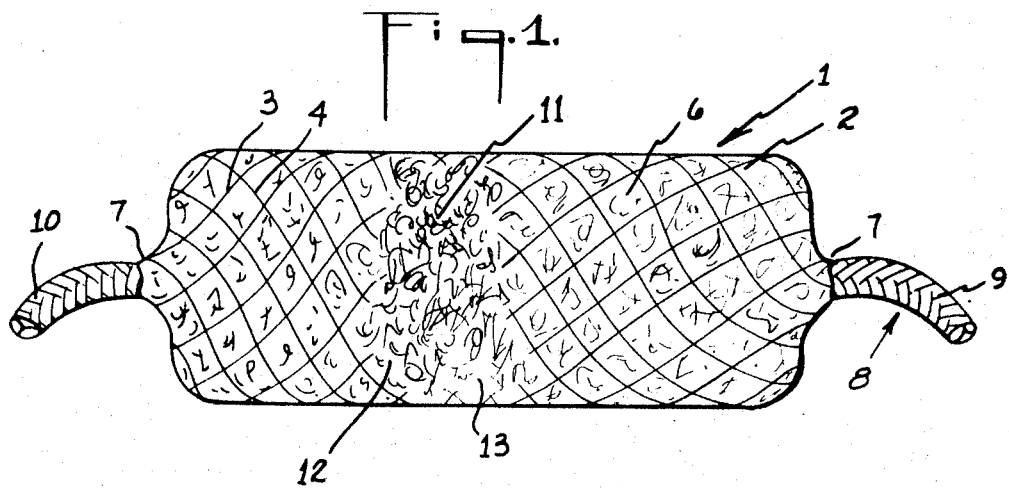
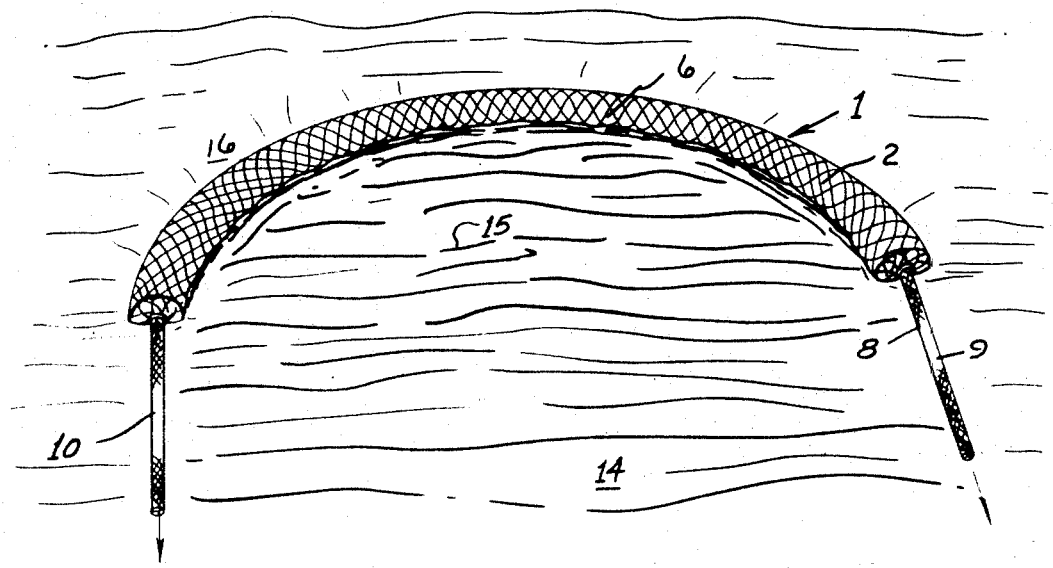

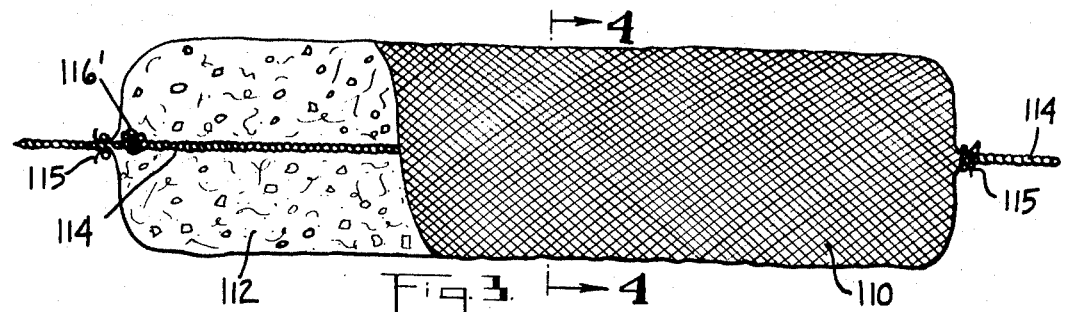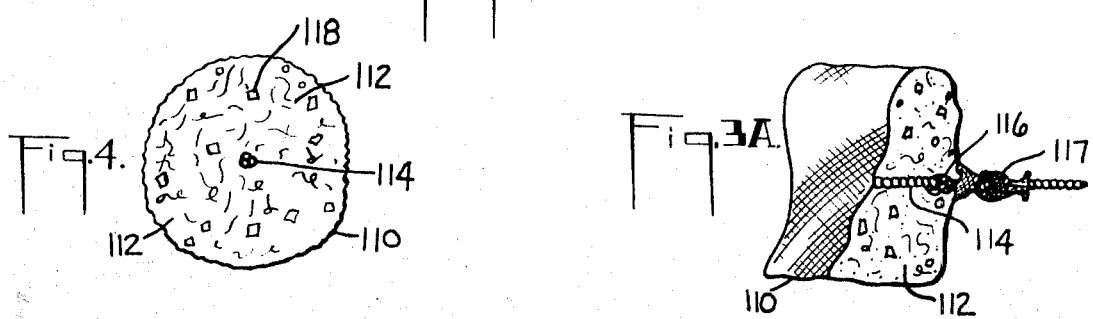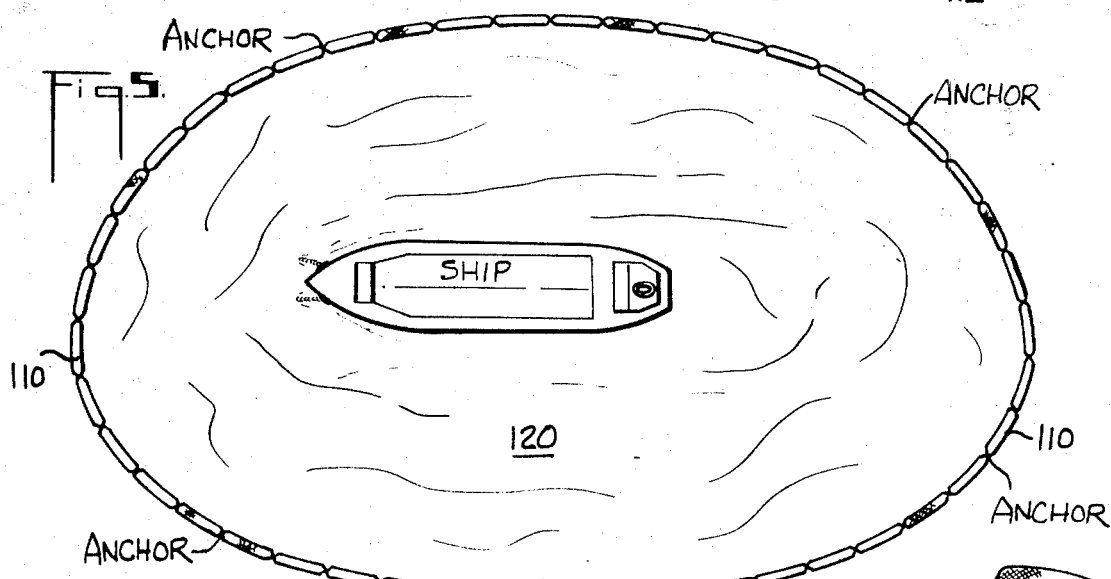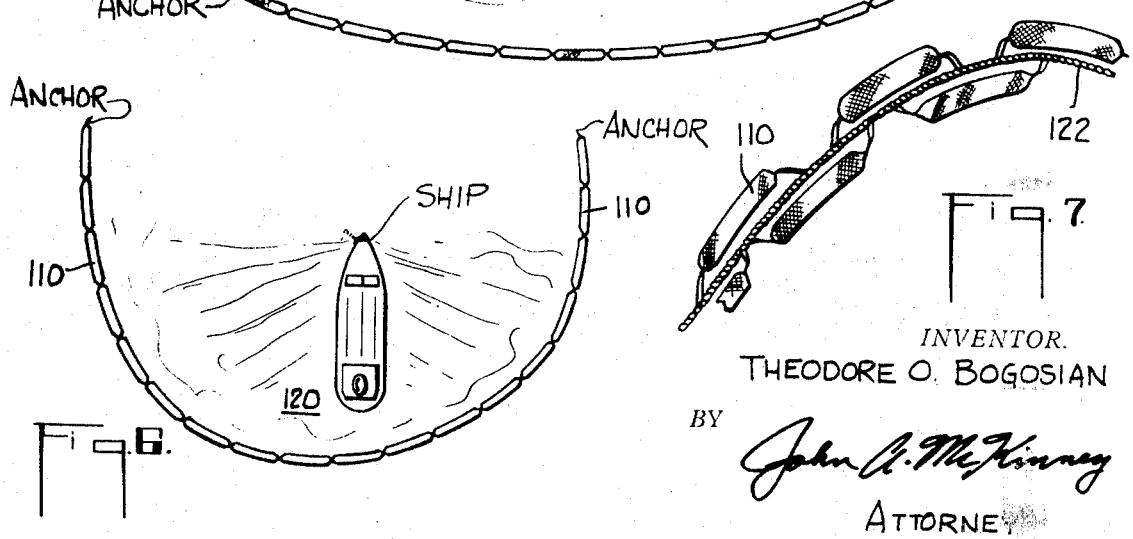
INVENTOR.
THEODORE O. BOGOSIAN
BY John A. McKinney
ATTORNEY

DEVICE FOR FENCING AND ABSORBING CONTAMINATING OIL SPILLS ON WATER

CROSS REFERENCE TO RELATED APPLICATIONS

This application is a continuation-in-part of application Ser. No. 805,465, filed Mar. 10, 1969, now abandoned, which in turn is a continuation-in-part of application Ser. No. 748,977, filed July 31, 1968, also now abandoned.

BACKGROUND OF THE INVENTION

Various means have been proposed in the past directed to confining and/or removing oil spills from the surface of water. Methods formerly proposed include the adding of a surface active agent to emulsify the oil and thereby bring about the precipitation of the oil which sinks to the bottom, a method of applying a synthetic rubber latex to the oil and thereafter coagulating the latex plus absorbed oil in the form of a rubber film which is subsequently collected from the surface of the water (see U.S. Pat. No. 3,265,616), and the method of applying oil absorbing or oil adsorbing materials such as hay, straw, ground bark, sawdust, bagasse, treated perlite, and shredded urethane foam. Another proposed method is the subjecting of the oil slick on the water to an agent which will congeal oil to a substantially stiff mass or gel that can be mechanically handled by physical means such as fine mesh nets or screens which will hold the congealed oil to allow water to drain through (see U.S. Pat. No. 3,198,731).

Detergents and other coagulating agents have been used but it is now recognized that it is undesirable to precipitate the oil to the bottom of the sea by use of detergents because this will destroy marine life.

BRIEF SUMMARY OF THE INVENTION

An object of this invention is to provide bodies for adsorbing oil on water.

Another object is to provide the elongate bodies with longitudinal reinforcing means for allowing the bodies to be connected in end-to-end relationship with sufficient strength for preventing elongation and necking down of netting containing the absorbing material of the body.

Another object is to provide flotation material for supporting the body even after absorption of oil.

Another object is to provide a flotation material interspersed with oil absorbing material within the body to provide buoyancy of the body even after absorption of oil.

Another object of the invention is to secure the bodies in substantial end-to-end relationship along a flexible rope-like member for fencing and absorbing a body of oil.

BRIEF DESCRIPTION OF THE DRAWING

The invention will be more fully understood and further objects and advantages thereof will become apparent when reference is made to the following detailed description of the preferred embodiment of the invention and the accompanying drawings in which:

FIG. 1 is a side view of the article of this invention;

FIG. 2 is a perspective view of the article of this invention deposited in the water for oil removal;

FIG. 3 is a side view of an alternate form of elongate oil absorbing body;

FIG. 3a shows an alternate form of securing an end of the elongate body;

FIG. 4 is a cross-sectional view taken generally along line 4—4 of FIG. 3;

FIG. 5 shows a plurality of elongate oil absorbing bodies connected together in end-to-end relationship for fencing polluting oil on water for absorption;

FIG. 6 is another arrangement of the elongate bodies disposed so as to retain or fence oil for absorption;

FIG. 7 shows an alternate arrangement of the elongate bodies.

DESCRIPTION OF THE PREFERRED EMBODIMENTS

In the embodiments of this invention there will be disclosed several arrangements for oil absorbing bodies so they can be employed to preferably surround or fence spilled oil on water for its absorption. The oil saturated bodies may be physically removed from the water and preferably burned.

The oil absorbing materials may vary over a wide range from strands of nylon fiber, rayon fiber, "TEFLON" shavings, polyester fiber, glass fiber, and the like, or fibers of wool or cotton. These fibers may be used in various combinations with each other to form an oil absorbing material. Reclaimed tire cord which may include any conventional whole tire cord fabric such as nylon, rayon, cotton, glass strands, or the like, has been found to be an effective absorbing material.

Polypropylene bags or sleeves having about ¼ mesh may be used to maintain the oil absorbing fibers in an elongate body or mass. Any suitable meshed netting in the form of a sleeve may be used just so it retains the fibers and is strong enough to permit physical handling even after a considerable weight of oil has been absorbed by the fibrous material inside.

The following examples are intended solely to illustrate the invention and are not intended to limit the invention. All percentages are by weight unless otherwise stated.

EXAMPLE I

A fibrous mass of rayon fiber was exposed to water having a coating of crude oil floating thereon. After permitting maximum adsorption by the fibrous material, it was found that the rayon fiber had adsorbed 20 to 25 times its weight in crude oil if no dripping is permitted to occur, and retains 15 times its weight in crude oil after dripping is permitted to occur.

EXAMPLE II

A fibrous material was exposed to water on which crude oil was floating. Thereafter a similar weight of the same fibrous material was reduced to a particulate form and exposed to water having the crude oil floating thereon. It was found that the fibers adsorb a higher percentage of oil by weight than the particulate materials, the particulate material adsorbing not more than about 5 times its weight in oil.

EXAMPLE III

One question which required an answer was the effect of water temperature. Oil slicks may occur in waters of widely varying temperatures and presumably these temperature variations would alter the viscosity of the oil. A simple laboratory experiment was therefore made to determine whether a given quantity of fiber adsorbed more or less oil when the water temperature was reduced. For this purpose oil was poured on water at room temperature and on water which was then chilled to 35°F. overnight. In the latter case, the oil thickened visibly. However, in each case, 7 grams of fiber removed 199 grams of oil. After allowing the oil to drip from the bundle for 15 minutes, the samples were reweighed and the weight was still almost exactly the same — approximately 100 grams. Therefore, there is no evidence from these experiments at least that the increased viscosity of the oil, produced by cooling, significantly alters the adsorptive effect.

EXAMPLE IV

In order to establish how much less there would be from the proposed adsorbent fibrous composition in a propylene bag, laboratory experiments were made in which the fibrous compositions were immersed in a "BUNKER C" oil for 2 hours and then drained for 3 minutes. This test sample used 56 grams of fiber and 7.5 grams of polypropylene mesh. Immediately upon removal from the oil, the weight of the sample was 810 grams. After 10 minutes of free draining, the weight had dropped to 695 grams or approximately 11 times the initial weight of the bag. The oil soaked bag was then laid on a bed of sand and left outdoors for 96 hours. There was no rain during this period and the weather was for the most part sunny. At the end of 24 hours, the weight had dropped to 505 grams and at the end of 96 hours, the weight had dropped to 427 grams. In other words, about 30 percent of the oil evaporated and/or leaked out on the sand in 24 hours, and 40 percent of it had evaporated and/or leaked out in 96 hours. However, it is significant and favorable to note that a considerable part of the oil was still retained by the fiber even under these severe conditions of exposure.

The "pillows" (bags) of this invention are useful in adsorbing oil in disasters of the type discussed above. However, they are additionally useful as movable oil adsorbing barriers protecting beach areas or barriers encircling ships to prevent oil spillage from leaving the area of the ship, or to protect the hulls of anchored ships from surrounding oil polluted waters, for example.

Referring to FIG. 1, such a closed bag 1 is comprised of a net 2 formed into a cylindrical container. The woof and warp threads 3 and 4 of the netting 2 form openings 6 which permit the water and surface oil to pass freely through the container periphery into the mass 11 of fibers contained in the bag 1. Netting from materials having good oil-resistant characteristics, such as polypropylene or polyethylene netting, are particularly advantageous for the bag material. Because of their oil resistance, very little of the oil is caught at the surface so that virtually all of it passes through the netting 2 into the mass 11. The fibrous mass 11 also has a tendency to roll or ball itself into a distinct mass inside the bag 1 leaving the openings 6 relatively free.

The ends 7 of the bag 1 may be secured to a rope 8 having its ends 9 and 10 free for dragging the bag 1 through the water.

An adsorbent material useful for the mass 11 contained within the netting is reclaimed tire cord known in the trade as "whole-tire-cord-fabric." Unfortunately, because the cord is recovered from old tires, the exact fiber identities are never really known. This fibrous mass is rayon, or nylon, or "DACRON" fiber, or most likely a blend of the materials, as these materials are the basic cord materials for United States passenger car and truck tires. At times the composition of the mass 11 may comprise fibers 12 having good noncompacting characteristics during oil adsorption. If such is the case, only one type of fiber 12 needs to be used, such as the fibers from whole-tire-cord fabric, even though the exact composition is not known. However, other materials may be added such as glass fibers 13, which assist in keeping the adsorbing fibers separated, i.e., fluffy and loose. A composition of about 5–10 percent glass fibers mechanically intermixed with 90–95 percent reclaimed tire cord has proven to be satisfactory.

Referring to FIG. 2, a body 14 of water is contaminated by oil 15 floating on its surface. The oil may be a light deposit, such as in a harbor or at a mooring, or it may be a heavy surface deposit, as by heavy leakage from a disabled tanker. Along bag 1 is brought to the contaminated area. The rope ends 9 and 10 may be towed by separate boats running parallel to each other, the bag then taking a horseshoe shape. The bag 1 is then towed through the contaminated area. The liquids freely pass through the open weave of the netting. With a light surface contamination, the surface 16 outside the bend can be very clear. With such contamination, one or two sweepings per day would be sufficient to keep the surface area clear of oil. On the other hand, with a strong continuous source of contamination, such as a leaky disabled tanker, the surface contamination may be such that a plurality of units may be required to be utilized, each being swept back and forth across a surface area of contamination.

The use of an oil-resistant container for the fibrous mass has advantages in light contamination and in heavy contamination. With light contamination, the netting remains relatively clean. Since the bag may be required to remain in the water unused for extended periods, the covering is acceptable in appearance in a harbor area. In heavy contamination, there is virtually no adsorption of the oil on the netting so that all of the surface oil passes directly to the fibrous mass.

With polypropylene netting, a designation R178 was found to be close to the minimum mesh usable while still obtaining free flow of liquids and virtually no bridging. This trade designation means that the netting cross-section is round and the standard weaving head uses 178 needles. The mesh produced openings of about three thirty-seconds inch. R144 netting also was found to be very satisfactory, containing about 5/32 inch openings. A mesh of about two openings to the lineal inch was marginal in its functioning characteristics. With this degree of openness, the entrapped fibers tended to escape from within the enclosure.

In the specification reclaimed tire-cord fibers or fibers from whole-tire-cord fabric are intended to signify fibers resulting from used tire processing. Used tires are mechanically shredded and the rubber is separated from the shredded tire-cord. A mass of tire-cord fiber resulting from this process is not consistent in its composition. However, as indicated, it is usually of rayon, and/or nylon, and/or "DACRON" fibers. Small rubber particles also adhere to the reclaimed fibrous mass as an impurity. Generally fibers from this process are about 1 – 1½ inch in length or less.

As shown in FIG. 3, a sleeve-like mesh net 110 retains oil absorbing material 112, such as the fibers previously disclosed, in an elongate body form. A rope-like reinforcing member 114 is disposed through the sleeve and the open ends 115 of the sleeve are closed therearound. The rope extends beyond each end of the enclosed net for providing means for tieing or otherwise securing the bodies in substantial end-to-end relationship. It will be noted in FIG. 3 that knots 116 are tied in the rope at spaced apart locations just short of the sleeve extremity so as to prevent displacement of the sleeve and adsorbing material along the rope. The sleeve net end 115 may be gathered about the rope and secured thereto by a string or other fastening means as shown in FIG. 3, or the net and rope tied in an overhand knot 117 as shown in FIG. 3a. In either arrangement a sufficient length of rope extends beyond each end of the closure to permit the elongate bodies to be tied together in end-to-end relationship.

The cross-sectional view of FIG. 4 shows oil absorbing fibers 112 having interspersed therewith particles 118 of low density for defining flotation material. The purpose of this material is to aid the elongate body in remaining afloat even after absorption of oil by the fibers. Particles 118 may be chunks of expanded polystyrene of a size not to pass through the mesh of sleeve 110. The original density of material 112 may vary from around 2 – 6 pounds per cubic foot. This material will float, but after considerable exposure in water and absorption of oil tends to ride very low in the water. Therefore, an amount of flotation material 118 is added thereto to make the elongate body more buoyant.

FIG. 5 illustrates oil spillage 120 about a ship. A series of elongate oil absorbing bodies 110 are secured together in end-to-end fashion to surround or fence the oil for absorption. It may be found necessary to anchor the enclosing bodies as indicated to contend with tide and winds which tend to move or shift the body of oil.

An arrangement of a series of the elongate bodies in end-to-end relationship is shown in FIG. 6 wherein the line of absorbing bodies 110 is secured at spaced anchors to form an open mouth configuration. This arrangement is adapted to be used where current flow is in one direction only as in a river. In the arrangements illustrated in FIGS. 5 and 6, the rope-like reinforcing member runs longitudinally with all the bodies, thereby permitting them to be pulled through the water without substantial elongation. Longitudinal strength is provided in the sleeve, and it will be noted in FIG. 1 and 2, as well, that ends 9 and 10 are indicated for this purpose.

Normally the ends of the elongate bodies (bags) are tied together in a square knot so that the bodies lie substantially in end-to-end abutting relationship.

FIG. 7 illustrates that the elongate bodies may be secured to a continuous rope or cable 122 so as to define a fence of the oil absorbing material. As previously indicated, rope 122 lends additional strength to the arrangement so that they can be moved to and held in position against current and wind.

Rope or reinforcing member 114 lends longitudinal strength to the elongate body. Since the rope does not substantially stretch, strain is not passed on to the sleeve fabric, which in an unprotected state tends to neck down and compress the oil absorbing fibers. While the rope is indicated as running through the center of the body of absorbing material, it will be appreciated that the rope can run along one side of the sleeve — either inside or outside. Likewise, the flotation material is preferably interspersed with absorbing fibers, but the device will function even with the flotation material being located in other positions. Applicant has disclosed his preferred embodiments.

What is claimed is:

1. An article for collecting contaminating oil from the surface of open water comprising:
    a. an open-mesh container;
    b. in said container
        i. a mass of fibrous oil-absorbing material consisting essentially of a mixture of glass fibers and cord reclaimed from used tires by a process comprising shredding and separation of the cord from the rubber matrix, said cord consisting essentially of fibers of nylon, rayon, polyester, or mixtures thereof; and
        ii. a flotation material consisting essentially of expanded polystyrene having a specific gravity sufficiently less than that of water to render the flotation material capable of maintaining the buoyancy of said article after absorption of said oil by said fibrous oil-absorbing material; and
    c. reinforcing means extending through said container for attachment to other like containers in adjacent relationship for establishing a series of said containers for fencing and absorbing contaminating oil on water.

2. The article of claim 1 wherein said reinforcing means is a rope.

3. The article of claim 2 wherein said rope extends substantially through the center of said container.

4. The article of claim 1 wherein said open-mesh container is an open-mesh flexible sleeve closed at its ends.

5. The article of claim 1 wherein said fibrous oil absorbing material consists essentially of 5 to 10 percent of glass fibers and 90–95 percent of cord reclaimed from used tires.

6. An article for collecting contaminating oil from the surface of open water comprising a plurality of elongate bodies each comprising:
    a. an open-mesh container;
    b. in said container
        i. a mass of fibrous oil-absorbing material consisting essentially of a mixture of glass fibers and cord reclaimed from used tires by a process comprising shredding and separation of the cord from the rubber matrix, said cord consisting essentially of fibers of nylon, rayon, polyester or mixtures thereof; and
        ii. a flotation material consisting essentially of expanded polystyrene having a specific gravity sufficiently less than that of water to render the flotation material capable of maintaining the boyancy of said article after absorption of said oil by said fibrous oil-absorbing material; and
    c. longitudinal reinforcing means extending through said container for attachment to other like containers in adjacent relationship; and
said plurality of elongate bodies being adapted to be substantially linearly disposed along said longitudinal reinforcing means for presenting a fence for restraining contaminating oil for absorption.

7. The article of claim 6 wherein the reinforcing means comprises rope.

8. The article of claim 7 wherein each elongate body is attached to said rope in general parallel relationship therewith.

9. The article of claim 6 wherein said fibrous oil absorbing material in each of said containers consists essentially of 5 to 10 percent of glass fibers and 90–95 percent of cord reclaimed from used tires.

* * * * *